US012601103B2

(12) United States Patent
Brown et al.

(10) Patent No.: US 12,601,103 B2
(45) Date of Patent: Apr. 14, 2026

(54) FOREIGN SUBSTRATE COLLECTOR FOR A LAUNDRY APPLIANCE

(71) Applicant: WHIRLPOOL CORPORATION, Benton Harbor, MI (US)

(72) Inventors: Grace K. Brown, Granger, IN (US); Mark Jason Christensen, Stevensville, MI (US); Heather Ann Hellmuth, St. Joseph, MI (US); Michael Adam Ledford, St. Joseph, MI (US); Meagan Kathleen VanderVelde, St. Joseph, MI (US); Sander Brouwer, Comerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 724 days.

(21) Appl. No.: 17/987,372

(22) Filed: Nov. 15, 2022

(65) Prior Publication Data

US 2023/0151537 A1 May 18, 2023

Related U.S. Application Data

(60) Provisional application No. 63/280,312, filed on Nov. 17, 2021.

(51) Int. Cl.
*D06F 58/08* (2006.01)
*B01D 46/00* (2022.01)
(Continued)

(52) U.S. Cl.
CPC ......... *D06F 58/22* (2013.01); *B01D 46/0002* (2013.01); *B01D 46/0086* (2013.01); (Continued)

(58) Field of Classification Search
CPC .......... D06F 58/22; D06F 58/08; D06F 58/42; D06F 58/203; D06F 33/50; D06F 33/30; (Continued)

(56) References Cited

U.S. PATENT DOCUMENTS 3,854,219 A * 12/1974 Staats ........................ F26B 3/34
34/265
3,959,891 A 6/1976 Burkall
(Continued)

FOREIGN PATENT DOCUMENTS

EP 1380683 A2 1/2004
JP 2004121352 A 4/2004
(Continued)

*Primary Examiner* — Deming Wan
(74) *Attorney, Agent, or Firm* — Price Heneveld LLP

(57) ABSTRACT

A laundry appliance includes a cabinet. A drum disposed within the cabinet and has an inner circumferential wall. At least one lifter is operably coupled to the inner circumferential wall of the drum. A motor is operably coupled to the drum and is disposed within the cabinet. A controller is disposed within the cabinet and is communicatively coupled to the motor. A negatively-charged member selectively disposed within the drum. A negative charge is configured to attract oppositely-charged foreign substrates to the negatively-charged member. The negatively-charged member is selectively coupled to the at least one lifter.

13 Claims, 12 Drawing Sheets

(51) Int. Cl.

| | |
|---|---|
| *B01D 46/24* | (2006.01) |
| *B03C 3/04* | (2006.01) |
| *B03C 3/28* | (2006.01) |
| *D06F 23/02* | (2006.01) |
| *D06F 25/00* | (2006.01) |
| *D06F 33/30* | (2020.01) |
| *D06F 33/50* | (2020.01) |
| *D06F 34/20* | (2020.01) |
| *D06F 34/28* | (2020.01) |
| *D06F 37/06* | (2006.01) |
| *D06F 58/20* | (2006.01) |
| *D06F 58/22* | (2006.01) |
| *D06F 58/42* | (2020.01) |
| *D06F 103/42* | (2020.01) |
| *D06F 105/30* | (2020.01) |
| *D06F 105/46* | (2020.01) |
| *D06F 105/52* | (2020.01) |
| *D06F 105/58* | (2020.01) |

(52) U.S. Cl.
CPC ............... *B01D 46/24* (2013.01); *B03C 3/04* (2013.01); *B03C 3/28* (2013.01); *D06F 23/02* (2013.01); *D06F 25/00* (2013.01); *D06F 33/30* (2020.02); *D06F 33/50* (2020.02); *D06F 34/20* (2020.02); *D06F 34/28* (2020.02); *D06F 37/06* (2013.01); *D06F 58/08* (2013.01); *D06F 58/42* (2020.02); *D06F 2103/42* (2020.02); *D06F 2105/30* (2020.02); *D06F 2105/46* (2020.02); *D06F 2105/52* (2020.02); *D06F 2105/58* (2020.02)

(58) Field of Classification Search
CPC .......... D06F 34/20; D06F 34/28; D06F 23/02; D06F 37/06; F06F 25/00; B01D 46/0002; B01D 46/24; B03C 3/04; B03C 3/28

USPC ........................................................... 34/60
See application file for complete search history.

(56) References Cited

U.S. PATENT DOCUMENTS

| | | | |
|---|---|---|---|
| 4,638,573 | A | 1/1987 | Nakamura et al. |
| 4,920,662 | A | 5/1990 | Seeburger |
| 7,311,267 | B2 | 12/2007 | Griese et al. |
| 7,441,345 | B2 | 10/2008 | Taylor |
| 9,217,220 | B2 | 12/2015 | Ahn et al. |
| 10,077,528 | B2 | 9/2018 | Yoichi et al. |
| D833,698 | S | 11/2018 | Lyne et al. |
| 10,531,784 | B2 | 1/2020 | Sweigart |
| 2006/0288600 | A1 | 12/2006 | Taylor |
| 2007/0271966 | A1* | 11/2007 | O'Brien ................ D06F 58/203 |
| | | | 68/2 |
| 2008/0256821 | A1 | 10/2008 | Jordan |
| 2008/0282569 | A1* | 11/2008 | Roberts ................... D06F 58/22 |
| | | | 34/82 |
| 2013/0260625 | A1 | 10/2013 | Ramirez et al. |
| 2015/0284897 | A1 | 10/2015 | Reid et al. |
| 2017/0055807 | A1 | 3/2017 | Rucki |
| 2019/0126326 | A1 | 5/2019 | Lyne et al. |
| 2019/0177905 | A1* | 6/2019 | Ayers ...................... D06F 60/00 |
| 2020/0102695 | A1* | 4/2020 | Khizar ...................... A61L 2/10 |
| 2020/0129908 | A1* | 4/2020 | Choi ...................... B01D 46/64 |
| 2020/0149212 | A1* | 5/2020 | Kim ........................ D06F 39/14 |

FOREIGN PATENT DOCUMENTS

| | | | |
|---|---|---|---|
| KR | 20020062452 | A | 7/2002 |
| KR | 20050066435 | A | 6/2005 |
| KR | 20190104750 | A | 9/2019 |
| WO | WO2019199269 | A1 | 10/2019 |

* cited by examiner

FOREIGN SUBSTRATE COLLECTOR FOR A LAUNDRY APPLIANCE

CROSS-REFERENCE TO RELATED APPLICATIONS

This application claims priority to U.S. Patent Application No. 63/280,312, filed on Nov. 17, 2021, entitled "FOREIGN SUBSTRATE COLLECTOR FOR A LAUNDRY APPLIANCE," the disclosure to which is hereby incorporated herein by reference in its entirety.

BACKGROUND OF THE DISCLOSURE

The present disclosure generally relates to a laundry appliance, and more specifically, to a foreign substrate collector for a laundry appliance.

SUMMARY OF THE DISCLOSURE

According to one aspect of the present disclosure, a laundry appliance includes a cabinet. A drum disposed within the cabinet and has an inner circumferential wall. At least one lifter is operably coupled to the inner circumferential wall of the drum. A motor is operably coupled to the drum and is disposed within the cabinet. A controller is disposed within the cabinet and is communicatively coupled to the motor. A negatively-charged member selectively disposed within the drum. A negative charge is configured to attract oppositely-charged foreign substrates to the negatively-charged member. The negatively-charged member is selectively coupled to the at least one lifter.

According to another aspect of the present disclosure, a laundry appliance includes a cabinet. A drum is disposed within the cabinet and has an inner circumferential wall. At least one lifter is operably coupled to the inner circumferential wall of the drum. A belt is disposed within the cabinet proximate the drum. A motor is operably coupled to the drum, is disposed within the cabinet, and is rearward of the belt. A controller is disposed within the cabinet and is communicatively coupled to the motor. A canister is disposed within the cabinet proximate the motor. The canister is configured to trap foreign substrates from the drum within the canister.

According to another aspect of the present disclosure, a laundry appliance includes a cabinet. A drum is disposed within the cabinet and having an inner circumferential wall. At least one lifter is operably coupled to the inner circumferential wall of the drum. A motor is operably coupled to the drum and is disposed within the cabinet. A controller is disposed within the cabinet and is communicatively coupled to the motor. The controller is configured with an algorithm configured to stop or alter rotational movement of the drum at a predetermined point in a laundry cycle. The algorithm is configured to stop a blower fan or alter a blower fan at the predetermined point in the laundry cycle. A foreign substrate collector is operably coupled to the drum.

These and other features, advantages, and objects of the present disclosure will be further understood and appreciated by those skilled in the art by reference to the following specification, claims, and appended drawings.

Figure 1:
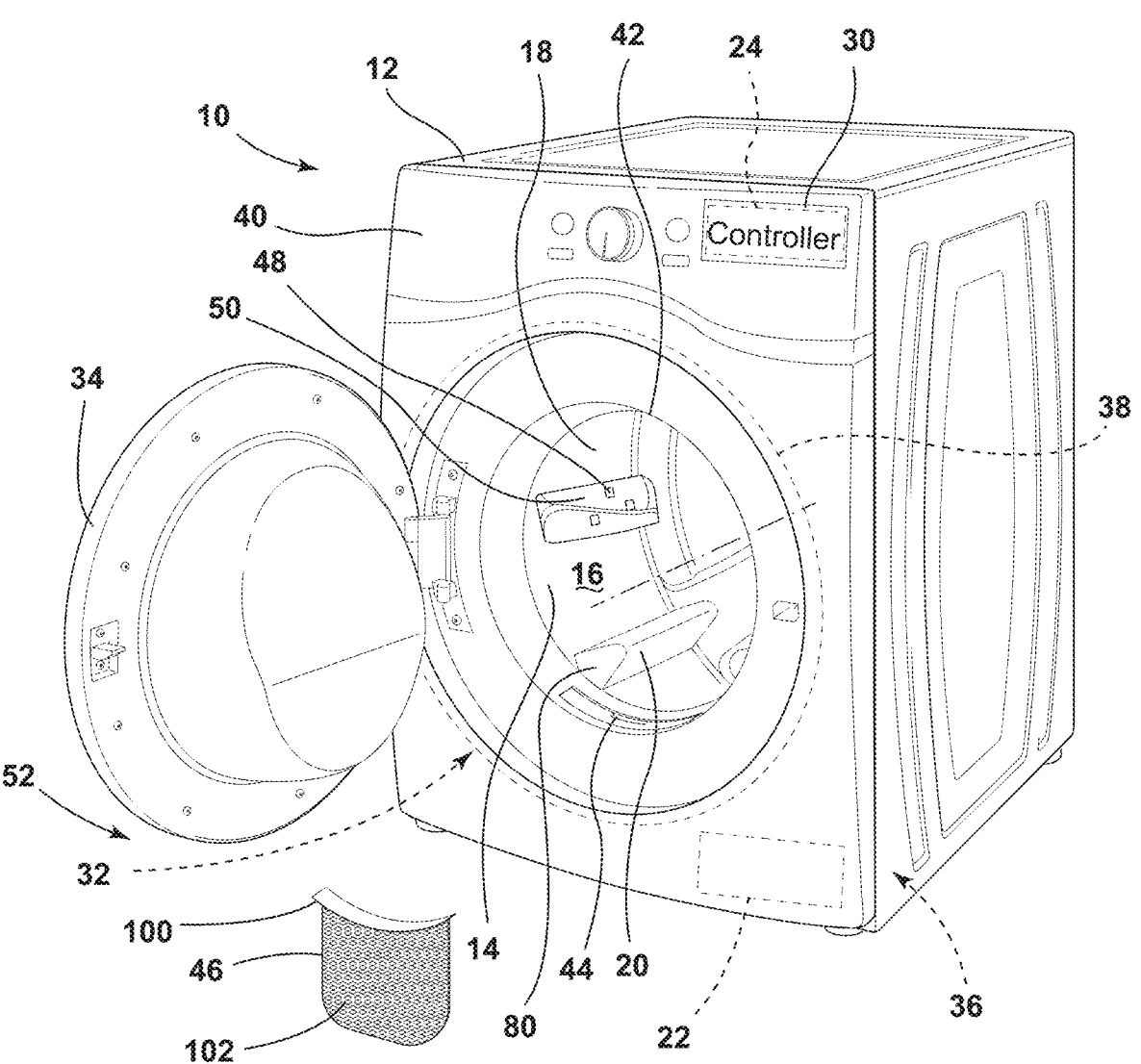
FIG. 1 is a partially exploded front perspective view of a laundry appliance of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a foreign substrate collector for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-19, reference numeral 10 generally designates a laundry appliance that includes a cabinet 12 and a drum 14 disposed within the cabinet 12. The drum 14 has an inner circumferential wall 16 that defines a laundry cavity 18, and at least one lifter 20 is operably coupled to the inner circumferential wall 16 of the drum 14. A motor 22 is operably coupled to the drum 14 and is disposed within the cabinet 12. A controller 24 is disposed within the cabinet 12 and is communicatively coupled to the motor 22.

Referring to FIG. 1, the laundry appliance 10 is depicted as a frontload laundry appliance, such that the laundry appliance 10 may be a washer, dryer, and/or a combination washer/dryer. A user interface 30 can be coupled to the cabinet 12 to select and control various cycles of the laundry appliance 10. In addition, a machine compartment 32 can be adjacent to a door 34 of the laundry appliance 10. The machine compartment 32 includes the motor 22, which is configured to operate the drum 14 within the cabinet 12. The controller 24 is communicatively coupled to the motor 22 and the user interface 30, such that the controller 24 can display user selections on the user interface 30. The machine compartment 32 of the laundry appliance 10 defines a cavity 36 in which the motor 22 can be accessed.

The cabinet 12 of the laundry appliance 10 includes a cabinet shell 40 and the door 34. The door 34 is hingedly coupled to the cabinet shell 40 and is configured to close an opening 42 defined by the cabinet shell 40 that provides access to the drum 14 within the cabinet 12. The cabinet shell 40 also defines a slot 44, in which a lint trap 46 can be selectively disposed in operable communication with the drum 14 of the laundry appliance 10. The lint trap 46 is described in further detail below.

As mentioned above, the laundry appliance 10 includes the controller 24 that is operably and communicatively coupled to the motor 22 of the laundry appliance 10. The controller 24 is configured with an algorithm of the laundry appliance 10 that is configured to stop or alter the rotational movement of the drum 14 at a predetermined point during a laundry cycle. By way of example, and not limitation, the algorithm can be configured to stop, start, and restart the motor 22 of the laundry appliance 10 mid cycle to liberate, transport, and collect foreign substrates 48 that can be disposed on articles 50, such as clothing items, fabrics, shoes, hats, and other wearable items, disposed within the drum 14. It is also contemplated that the algorithm can be configured to add an additional cycle at the end of a conventional laundry cycle to remove additional foreign substrates 48 from the articles 50 within the drum 14. It is generally contemplated that the foreign substrates 48 are trapped or otherwise collected by a foreign substrate collector 52 of the laundry appliance 10, described in detail below with respect to FIGS. 4-20. The foreign substrates 48 can be moved to the foreign substrate collector 52 through operation of a blower 154 that is configured to deliver process air through an airflow path 54 that includes the drum 14. The foreign substrate collector 52 is selectively positioned within the airflow path 54 for separating the foreign substrates 48, including pet hair, from the flow of process air moved through the airflow path 54. Typically, the blower 154 is operated by the controller 24. The blower can be operated by the motor 22 or can be operated by a dedicated blower motor that is separate from the motor 22.

Additionally, the controller 24 can include a microprocessor and/or other analog circuitry and/or digital circuitry for processing one or more algorithms. Also, the controller 24 can include memory for storing one or more algorithms. It should be appreciated that the controller 24 may be a stand-alone dedicated controller or a shared controller integrated with other control functions.

Figure 2:
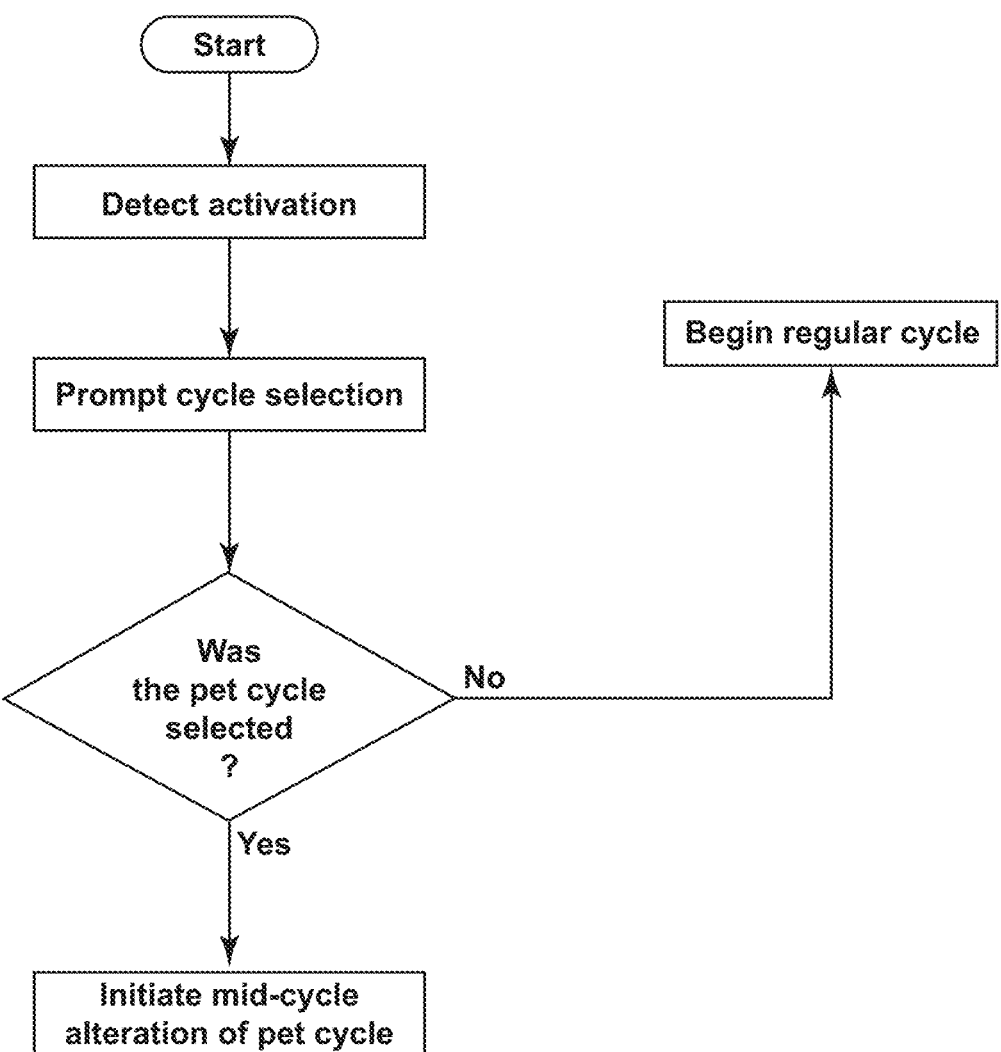
FIG. 2 is a flow diagram for a method of operating a laundry appliance of the present disclosure with a mid-cycle alteration.
Figure 3:
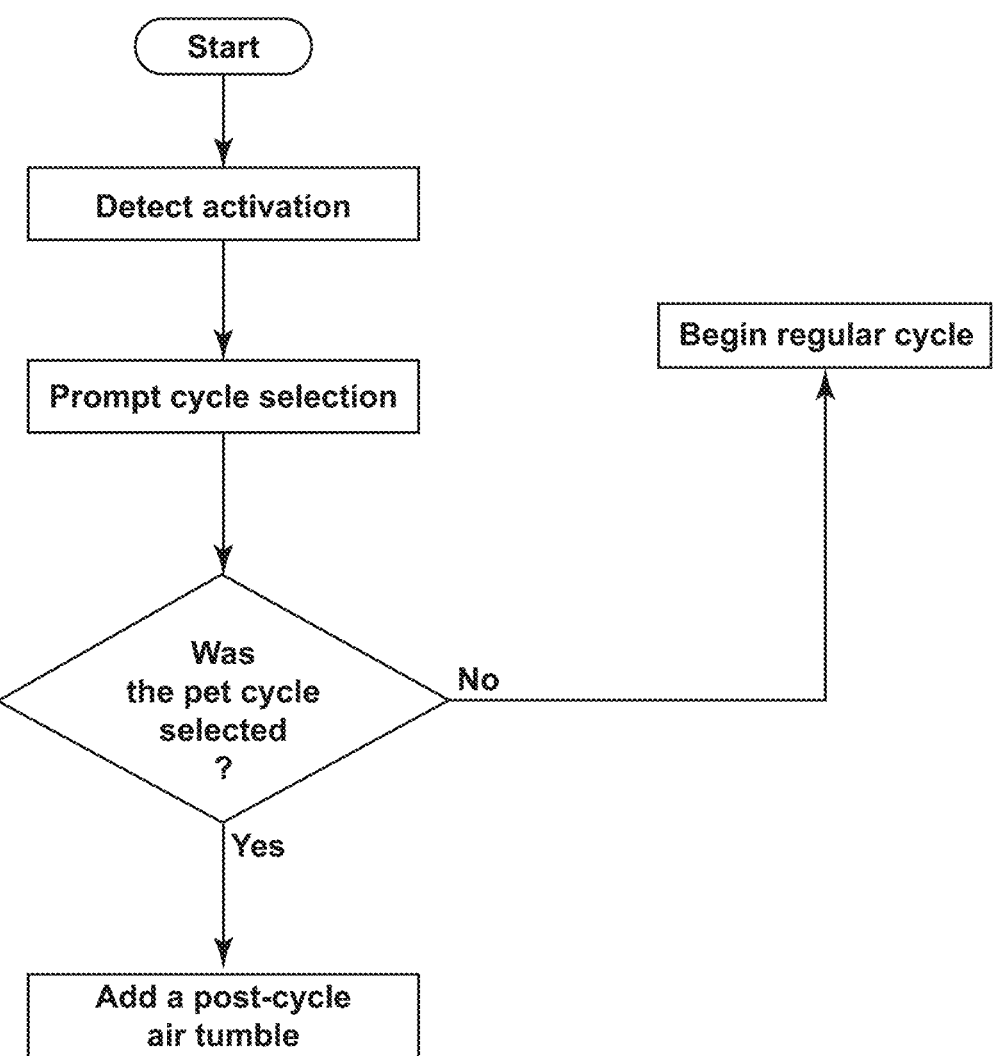
FIG. 3 is a flow diagram for a method of operating a laundry appliance of the present disclosure with a post-cycle air tumble.

With further reference to FIGS. 1-3, the first modification of the laundry cycle can include turning off the motor 22, which halts the rotation of the drum 14 and allows the articles 50 within the drum 14 to fall and disrupt the rotational movement of the drum 14, thereby causing an abrupt change in the movement of articles within the drum. This process can be programmed within the algorithm to repeat in order to maximize the amount of foreign substrates 48 dislodged from the articles 50 within the drum 14. The second algorithm, mentioned above, can be configured as a post cycle alteration, such that the post cycle alteration adds a cycle of air drying after a normal drying cycle is complete. The additional drying time added in the post cycle alteration is generally contemplated to be free from heat in order to further dislodge the foreign substrates 48 from the articles 50.

The controller 24 can be configured with various cycle selections including, but not limited to, a regular cycle, a delicate cycle, a bulky-items cycle, a steam cycle, a timed dry cycle, and/or a pet cycle. The controller 24 is configured to prompt a user via the user interface 30 to select a particular cycle for the laundry appliance 10. It is also contemplated that the controller 24 can prompt the user to remove the lint trap 46 in order to remove any potential foreign substrates 48 disposed on the lint trap 46 prior to initiating a cycle of the laundry appliance 10. The user can select the pet cycle of the laundry appliance 10, which initiates at least one of the algorithms of the controller 24.

It is generally contemplated that upon selection of the pet cycle, the user interface 30 can display an option between adding a post-cycle alteration or a mid-cycle alteration, or both. As illustrated in FIGS. 1 and 3, the post-cycle alteration is typically free from heat and extends the drying cycle by utilizing process air, driven by the blower 1534, to remove the foreign substrates 48 remaining on the articles 50 within the drum 14. The post-cycle alteration adds additional time after the selected laundry cycle in order to dislodge any remaining foreign substrates 48.

By way of example, not limitation, the post-cycle alteration can add approximately 30-minutes of additional operation of at least the drum 14 and the blower 154. It is also contemplated that the post-cycle modification can be greater than 30-minutes and/or less than 30-minutes. The mid-cycle alteration, illustrated in FIG. 2, is configured to adjust the selected laundry cycle by stopping the laundry cycle and restarting the laundry cycle at predetermined points in the cycle to allow the articles 50 to rest within the drum 14 and the foreign substrates 48 to dislodge from the articles 50. When a user selects the desired pet cycle on the user interface 30, the controller 24 stops the motor 22 at predetermined points during the pet cycle and restarts the motor 22 after a predetermined amount of time based on the programmed algorithm within the controller 24. As mentioned above, the laundry appliance 10 includes the foreign substrate collector 52. Various aspects of the foreign substrate collector 52 are described herein with respect to FIGS. 4-19. When the pet cycle is performed, the controller 24 stops operation of the motor 22 to stop rotation of the drum 14 for a predetermined period of time. The controller 24 then restarts the motor 22 to again rotate the drum 14. In certain aspects of the device, when the controller 24 stops the motor 22, the controller 24 can continue to operate the blower 154 to continue the flow of process air through the drum 14. This movement of the process air can assist in dislodging and capturing the foreign substrates 48 on the foreign substrate collector 52.

Figure 4:
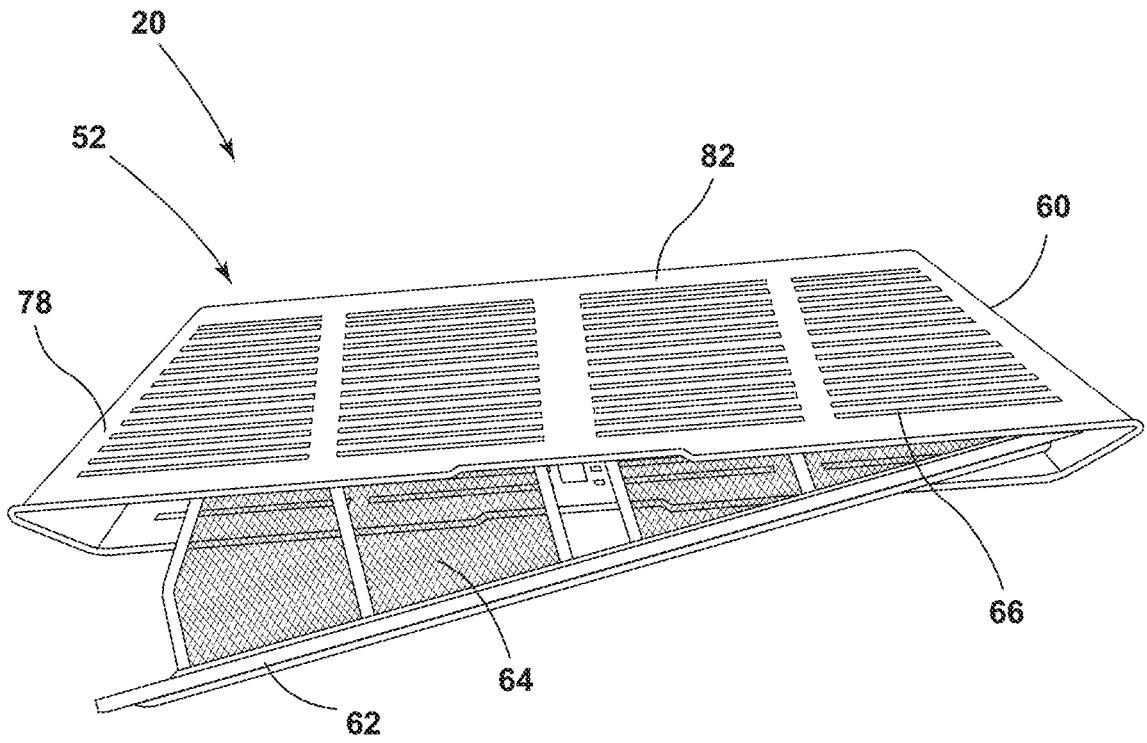
FIG. 4 is a side perspective view of a foreign substrate collector of the present disclosure.

Referring now to FIGS. 1 and 4, it is generally contemplated that the foreign substrate collector 52 can be integrally formed with the at least one lifter 20. The foreign substrate collector 52 illustrated in FIG. 4 includes a housing 60, a frame 62 disposed within the housing 60, and a filter 64 operably coupled to the frame 62. The housing 60 defines a plurality of slots 66 extending along a width of the frame 62 and are configured to receive foreign substrates 48 from the articles 50 within the drum 14.

The housing 60 can be hingedly coupled to the drum 14, such that a user can uncouple the housing 60 to access the frame 62 and the filter 64. The foreign substrates 48 can be loosened from the articles 50 and collected on the filter 64 in response to airflow 56 within the drum 14. It is generally contemplated that the airflow 56 may direct the foreign substrates 48 toward the foreign substrate collector 52. Additionally or alternatively, the articles 50 engages with the housing 60 and the foreign substrates 48 can be agitated and removed from the articles 50 to pass through the plurality of slots 66. Once removed, the foreign substrates 48 typically fit between each of the plurality of slots 66 and collect along the filter 64 within the frame 62 to be retained therewithin.

With further reference to FIGS. 1 and 4, the user can remove the frame 62 from the housing 60 to clean out and remove the foreign substrates 48 deposited along the filter 64. As mentioned above, the user can lift the housing 60 to access and remove the frame 62 and the filter 64. Additionally or alternatively, an end 78 of the housing 60 can provide access to the internal frame 62 and filter 64. By way of example, not limitation, the end 78 of the housing 60 can flip open via actuation of a button or other coupling member on the end 78 of the housing 60. The user can then slide or otherwise remove the filter 64 from the housing 60 remove the foreign substrates 48 therewithin.

As depicted, the filter 64 is illustrated as a mesh body. However, it is also contemplated that the filter 64 is a mesh insert disposed within the housing 60. It is generally contemplated that the at least one lifter 20 can include a first lifter 80 and a second lifter 82 (FIG. 1) disposed within the drum 14 along the inner circumferential wall 16. The first and second lifter 80, 82 can be configured as a foreign substrate collector 52 as described above. Additionally or alternatively, the first lifter 80 can be a foreign substrate collector 52 and the second lifter 82 can be configured as a traditional lifter within the laundry appliance 10. It is generally contemplated that in either configuration the foreign substrate collector 52 of the at least one lifter 20 generally extends along a length of the drum 14, parallel with a rotational axis of the drum 14. It is further generally contemplated that the at least one lifter 20 can be approximately 18 inches long. However, it is also contemplated that the at least one lifter 20 can be greater than 18 inches or less than 18 inches.

Figure 5:
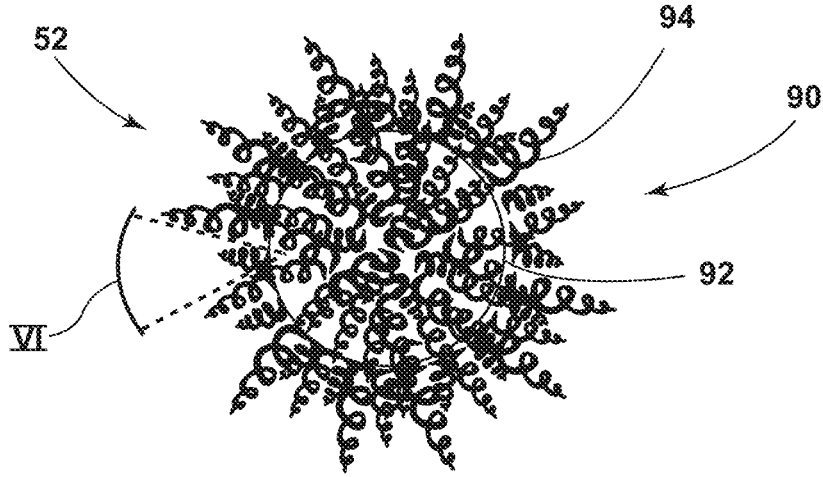
FIG. 5 is a side elevational view of a dryer ball of the present disclosure with a plurality of projections.
Figure 6:
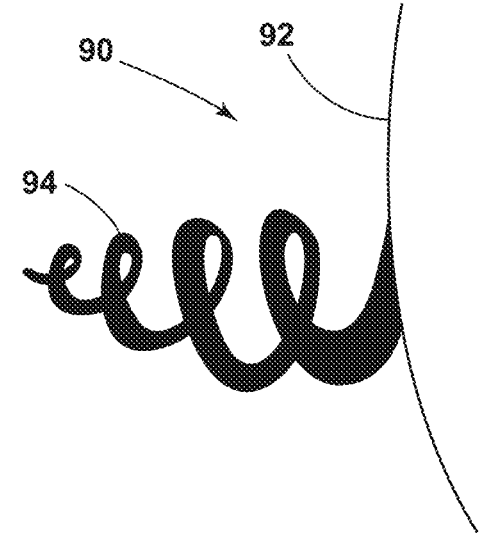
FIG. 6 is a partial enlarged side elevational view of a projection of the dryer ball of FIG. 5 taken at area VI.

Referring to FIGS. 1, 5, and 6, the foreign substrate collector 52 is illustrated as a dryer ball 90. The dryer ball 90 includes a body 92 and a plurality of spiralized projections 94 configured to engage the articles 50 in the drum 14. The spiralized projections 94 are closely arranged on the body 92 of the dryer ball 90. The spiralized projections 94 generally engage, agitate, and remove foreign substrates 48 from the articles 50. Once removed, the foreign substrates 48 can then be trapped by the spiralized projections 94 where the foreign substrates 48 are retained. The user can then remove the foreign substrates 48 from the dryer ball 90 once the laundry cycle is complete. It is also contemplated that the dryer ball 90 can be configured to minimize static electricity that accumulates on the articles 50 during the laundry cycle. In this manner, the dryer ball 90 can include a static mitigating material, such as aluminum, to minimize the electrostatic charges (or static electricity) present within the articles 50 being processed in the drum 14.

Figure 7:
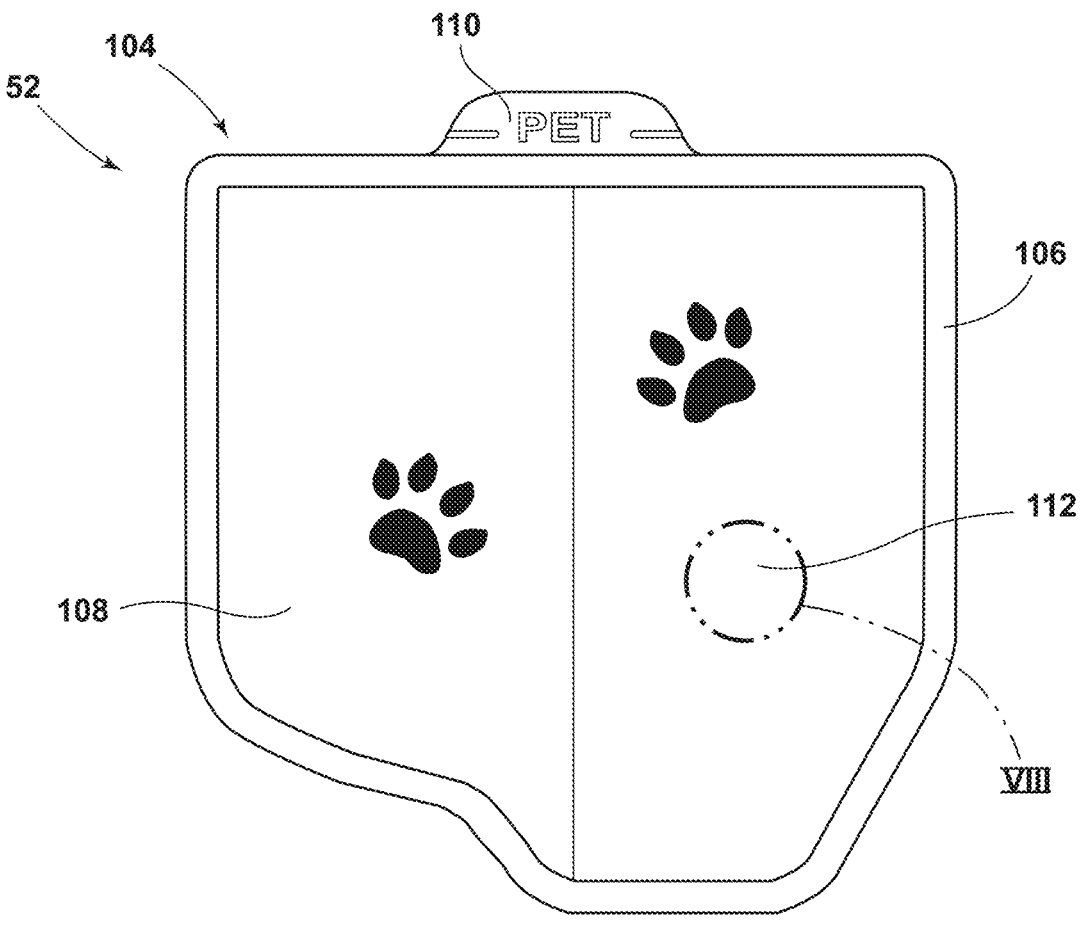
FIG. 7 is a side elevational view of a foreign substrate collector of the present disclosure.
Figure 8:
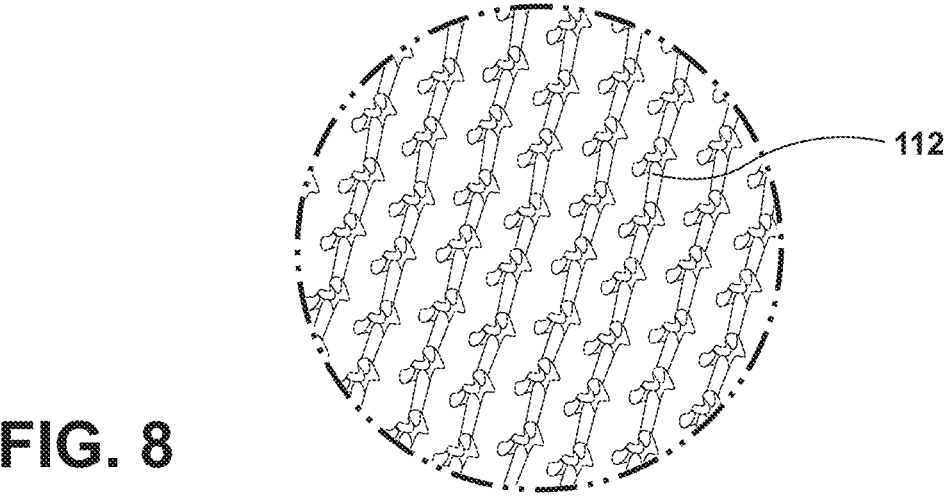
FIG. 8 is a partially enlarged elevational view of a material of the foreign substrate collector of FIG. 7 taken at area VIII.

Referring to FIGS. 1, 7, and 8 and as mentioned herein, the cabinet shell 40 defines the slot 44 in which the lint trap 46 can be disposed. The lint trap 46 is illustrated as having an outer frame 100 and a central lining 102 disposed within the outer frame 100. It is generally contemplated that the foreign substrate collector 52 can be configured as an alternate lint trap 104 specifically configured for use during the pet cycle of the laundry appliance 10. The alternate lint trap 104 can be referred to as the pet lint trap 104. The pet lint trap 104 includes a frame 106 and a collection body 108 disposed within the frame 106. The frame 106 includes a tab 110 that outwardly extends from the frame 106 and is configured for the user to grab or otherwise adjust the pet lint trap 104 relative to the cabinet shell 40 and the airflow path 54. The tab 110 can also serve to identify the pet lint trap 104 as compared to the lint trap 46. By way of example, not limitation, the pet lint trap 104 as illustrated in FIG. 7 includes the word "pet" to identify that the pet lint trap 104 is utilized when washing or drying the articles 50 or other user items typically associated with pets, such that those items may have accumulated more pet hair, as compared to other user items.

It is generally contemplated that the collection body 108 of the pet lint trap 104 can be larger than the central lining 102 of the lint trap 46. In addition, the collection body 108 can include a plurality of micro hooks 112 along at least one side of the collection body 108. The micro hooks 112 can trap the foreign substrates 48 along the collection body 108. Further, the collection body 108 can include a plurality of corrugations 176 along at least one side of the collection body 108. Additionally or alternatively, the collection body 108 can include a coating configured to attract and collect the foreign substrates 48. For example, a negatively-charged coating can be disposed across the collection body 108. The user can interchange the lint trap 46 with the pet lint trap 104 depending on the laundry cycle in operation. The separate lint traps 46, 104 allow the user to minimize cross-contamination between the pet lint trap 104 and the general use lint trap 46. Stated differently, the pet-related foreign substrates 48 that collect on the pet lint trap 104 are able to be generally segregated from the lint trap 46 as the lint trap 46 is configured for use with user items that may infrequently contact the pet-related foreign substrates 48 outside of the laundry appliance 10. Additionally, in settings where many animals are present or where a pet is present that undergoes significant shedding, the pet lint trap 104 can be the primary lint filter used within the laundry appliance 10.

Figure 9:
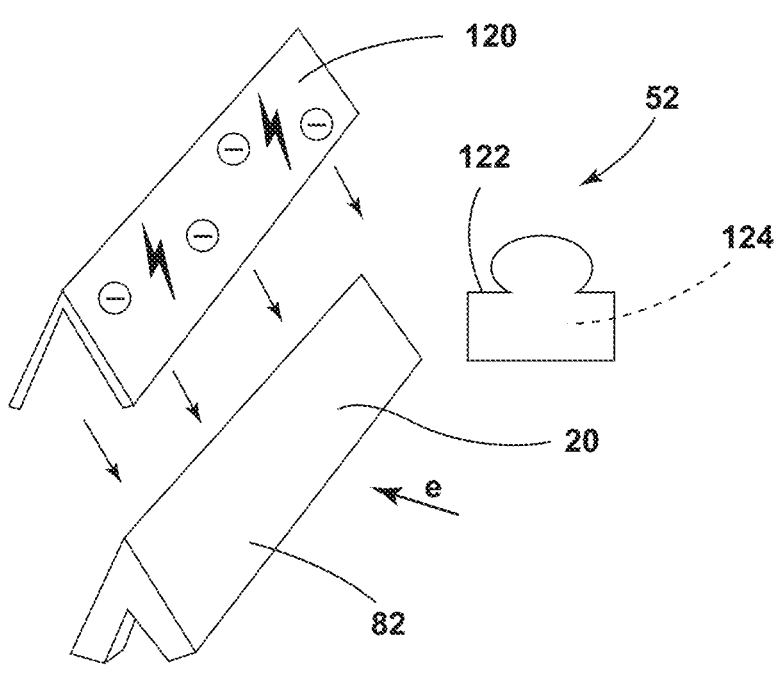
FIG. 9 is an exploded view of a foreign substrate collector and a lifter of the present disclosure.
Figure 10:
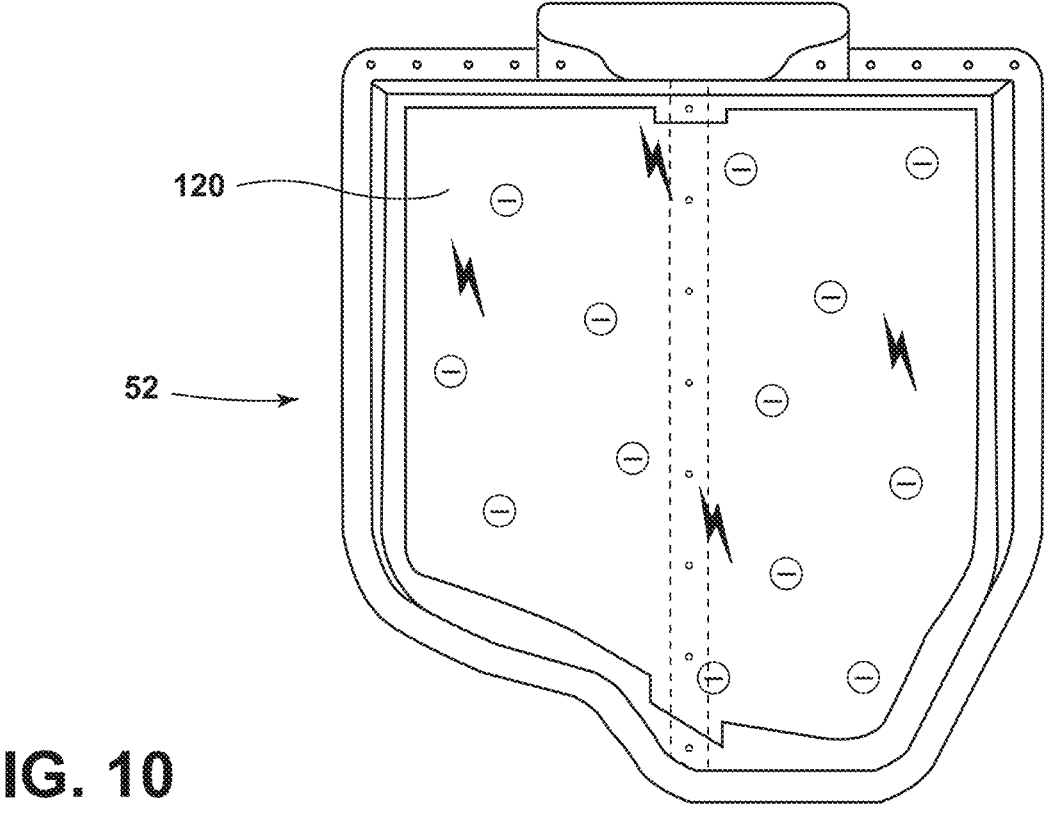
FIG. 10 is a side elevational view of a foreign substrate collector of the present disclosure with a negatively-charged coating.

Referring now to FIGS. 1 and 9-11, it is generally contemplated that the at least one lifter 20 can include the first lifter 80 and the second lifter 82, such that the first lifter 80 is the lifter described above with respect to FIG. 4 and the second lifter 82 is the baffle illustrated with respect to FIG. 9. It is also contemplated the at least one lifter 20 include a plurality of lifters and can be configured as any one of the lifter 20 as described with respect to FIGS. 4 and 9.

The foreign substrate collector 52 is illustrated as a negatively-charged member 120. As illustrated in FIG. 9, the negatively-charged member 120 is operably coupled to the at least one lifter 20. The negatively-charged member 120 can be coupled to the at least one lifter 20 via an adhesive or other known coupling member, such as fasteners. The negative charge of the negatively-charged member 120 can be generated with an ionizer 122. The ionizer 122 produces ions that are disposed on the negatively-charged member 120 to produce the negative charge. The ionizer 122 includes electrical circuitry 124 disposed within the ionizer 122 and configured to accumulate the negative ions disposed on the negatively-charged member 120. The ionizer 122 can be operably coupled to the at least one lifter 20 proximate to the negatively-charged member 120, and the electrical circuitry 124 of the ionizer 122 can be housed within the at least one lifter 20. Additionally or alternatively, the ionizer 122 can include a separate housing in which the electrical circuitry 124 can be housed.

With further reference to FIGS. 1 and 9-11, in an alternate aspect of the negatively-charged member 120, the negatively-charged member 120 can be disposed on the lint trap 46. In this configuration, the negatively-charged member 120 may be a liner, coating, or other layer that is disposed on the lint trap 46 and is operably coupled to the ionizer 122 to maintain and recharge the negatively-charged member 120. The ionizer 122 can be coupled to the cabinet shell 40 proximate to the slot 44 defined by the cabinet shell 40, such that the ionizer 122 is proximate to the lint trap 46 and the negatively-charged member 120. It is also contemplated that the lint trap 46, mentioned above, can have an electrostatic field generated across the lint trap 46 via the ionizer 122, such that the lint trap 46 is otherwise free from coatings or other liners disposed on the lint trap 46. In this configuration, the ionizer 122 can utilize an electrical source of the laundry appliance 10 to accumulate the negative ions across the lint trap 46 or otherwise charge the lint trap 46.

Figure 11:
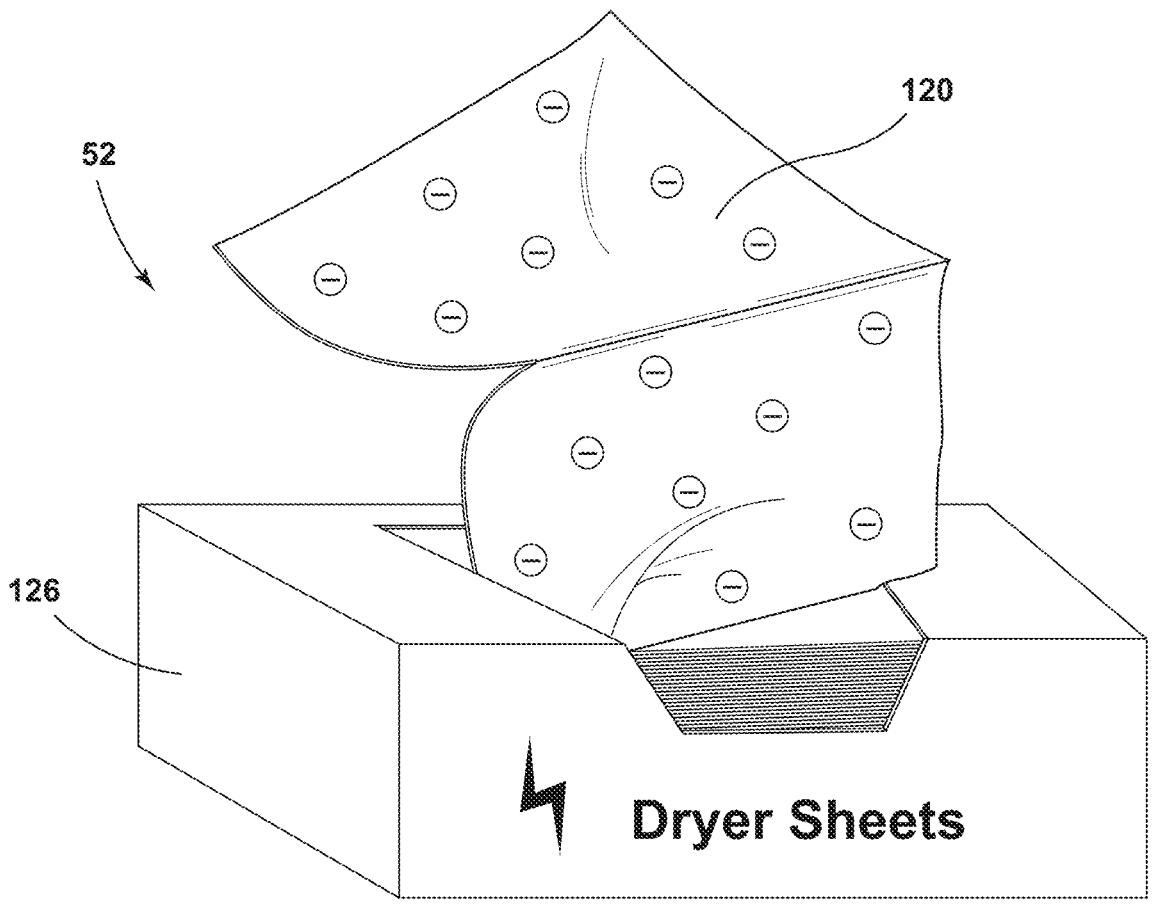
FIG. 11 is a side perspective view of a foreign substrate collector of the present disclosure within a container.
Figure 12:
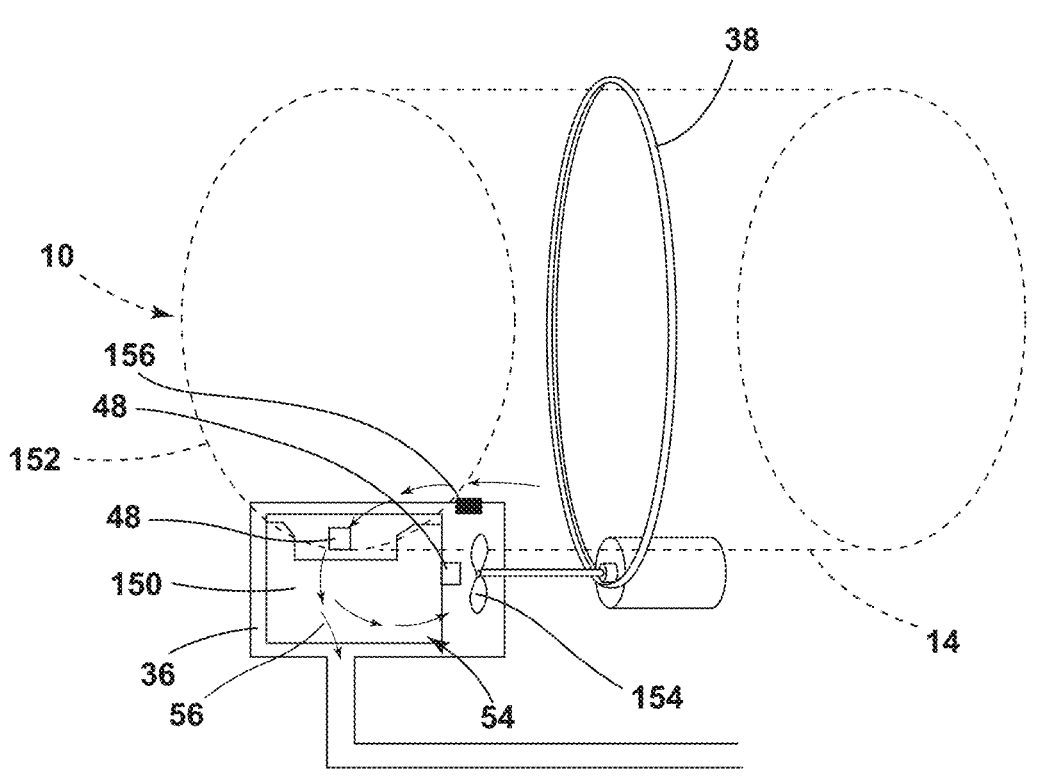
FIG. 12 is a schematic diagram of a laundry appliance of the present disclosure with a motor coupled with a belt for driving a drum of the laundry appliance.

In an alternate aspect, the negatively-charged member 120 can take the form of a negatively-charged dryer sheet as illustrated in FIG. 11. In this aspect, the negative charge is pre-applied to the negatively-charged dryer sheet to form the negatively-charged member 120 and is stored within an external container 126 that is configured to maintain and retain the negative charge of the negatively-charged member 120. The user can selectively dispose one of the negatively-charged members 120 from the container 126 into the laundry appliance 10, during a laundry cycle.

With further reference to FIGS. 1 and 9-11, the negatively-charged member 120 is configured to attract the foreign substrates 48 to the negatively-charged member 120 in any one of the aspects described above. It is generally contemplated that the foreign substrates 48 typically have an opposite charge of the negatively-charged member 120, such that the opposite charge of the foreign substrates 48 draws the oppositely-charged foreign substrates 48 to the negatively-charged member 120.

Referring now to FIGS. 1 and 12-19, the foreign substrate collector 52 is illustrated as a canister 150 disposed within the cavity 36 positioned in a forward portion 152 of the laundry appliance 10. Specifically, the cavity 36 is defined forward of the belt 38 of the laundry appliance 10. In this configuration, the motor 22 is disposed between the belt 38 and the drum 14, which provides an increased volume for the cavity 36 in the forward portion 152 of the laundry appliance 10. The foreign substrate collector 52 can have a larger construction as a result of the increased size of the cavity 36 in which the foreign substrate collector 52 is disposed. Alternatively, the motor 22 can be disposed proximate the drum 14 and rearward of the belt 38. In this configuration, the foreign substrate collector 52 can have a larger construction as a result of the increased size of the cavity 36 due to the rearward placement of the motor 22. A blower fan 154 of the laundry appliance 10 is disposed within the cavity 36 proximate to the canister 150 to direct the foreign substrates 48 from within the cavity 36 toward the canister 150 within the cavity 36. The cavity 36 is generally fluidly coupled to the air flow path of the laundry appliance 10, such that the air that passes through the canister 150 within the cavity 36 can be circulated or recirculated into the drum 14. For example, an airflow path 54 is directed by the blower fan 154 into the cavity 36. The airflow path 54 passes through the canister 150 and filters out any potential foreign substrates 48 present in the airflow path 54. The filtered process air can then be recycled through the laundry appliance 10, and the foreign substrates 48 are retained within the canister 150.

It is generally contemplated that the canister 150 is configured to receive foreign substrates 48 that can be loosened and deposited through a plurality of laundry cycles. Stated differently, the user can repeatedly run laundry cycles before removing the foreign substrates 48 from the canister 150. The canister 150 can be communicatively coupled to the controller 24, such that the controller 24 can detect when the foreign substrates 48 should be removed from the canister 150. The controller 24 can be programmed with a predetermined number of cycles of the laundry appliance 10 that can run before the removal of the foreign substrates 48. Additionally or alternatively, the canister 150 can be configured with a sensor 156 that is communicatively coupled to the controller 24. The sensor 156 can detect when the amount of foreign substrates 48 within the canister 150 exceeds a predetermined level, and the sensor 156 sends a signal to the controller 24 to display a notification on the user interface 30. Additionally or alternatively, the controller 24 can be configured to determine an amount of accumulated foreign particulates 48 in the canister 150 from the signal sent by the sensor 156. The controller 24 can also be configured to display the amount of accumulated foreign particulates 48 on the user interface 30. It is generally contemplated that the canister 150 may have a variety of shapes and configurations. By way of example, not limitation, the canister 150 may be circular, cylindrical, conical, rectangular, planar, and any other shape generally known in the art.

Figure 13:
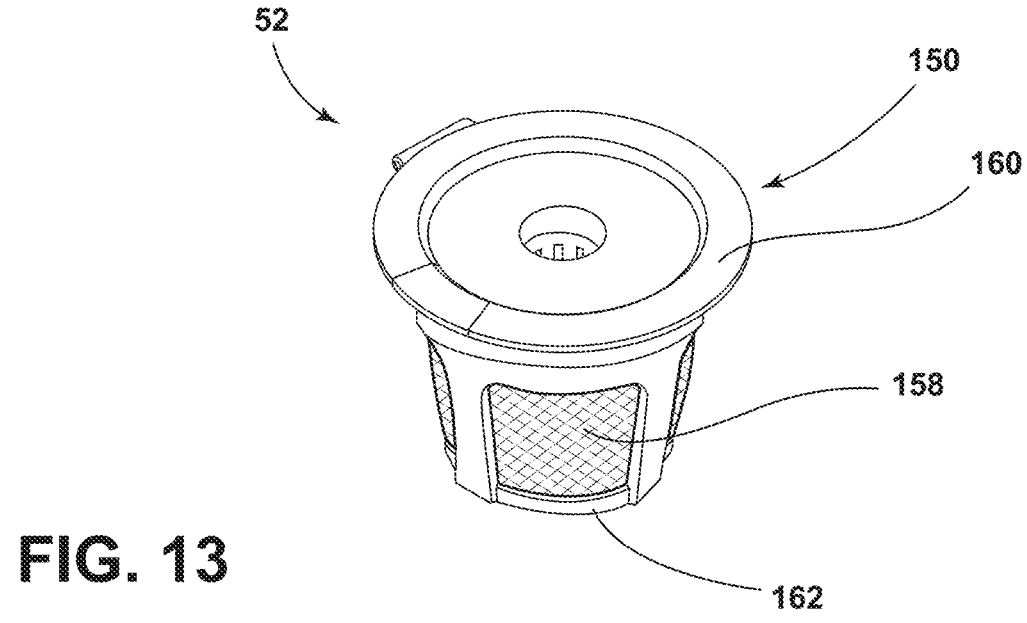
FIG. 13 is a top perspective view of an aspect of a canister of the laundry appliance of FIG. 12.

For example, as illustrated in FIGS. 13-16, the canister 150 can include mesh walls 158. The mesh walls 158 are configured to trap the foreign substrates 48 within the canister 150. The canister 150 illustrated in FIG. 13 includes a top 160 and a solid base 162, and the foreign substrates 48 can generally enter the canister 150 via the top 160 and are retained by the mesh walls 158 and the solid base 162. This configuration generally maximizes the retention of the foreign substrates 48 within the canister 150 by providing selective access into the canister 150. As illustrated in FIG. 13, the canister 150 may define a frustoconical shape where the top 160 has a greater diameter than the solid base 162 and the mesh walls 158 taper downward towards the solid base 162. In such a configuration, the collection of the foreign substrates 48 can be maximized as the tapering of the mesh walls 158 increases airflow 56 through the mesh walls 158. Additionally or alternatively, the canisters 150 illustrated in FIGS. 14 and 15 have the solid base 162 and the mesh walls 158, but are generally open to collect the foreign substrates 48 via a top portion 164 in addition to the mesh walls 158. This configuration maximizes the collection of foreign substrates 48 by providing increased surface area through which the foreign substrates 48 pass.

Figure 14:
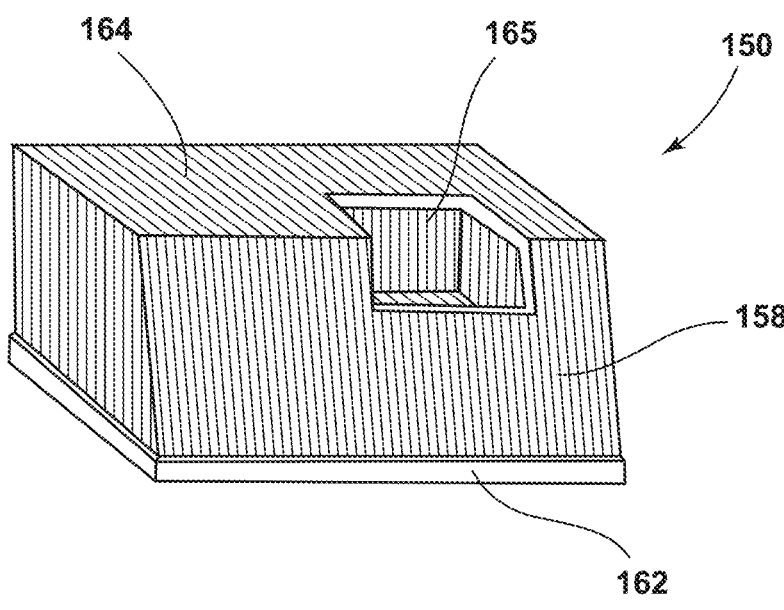
FIG. 14 is a top perspective view of an aspect of a canister of the laundry appliance of FIG. 12.
Figure 15:
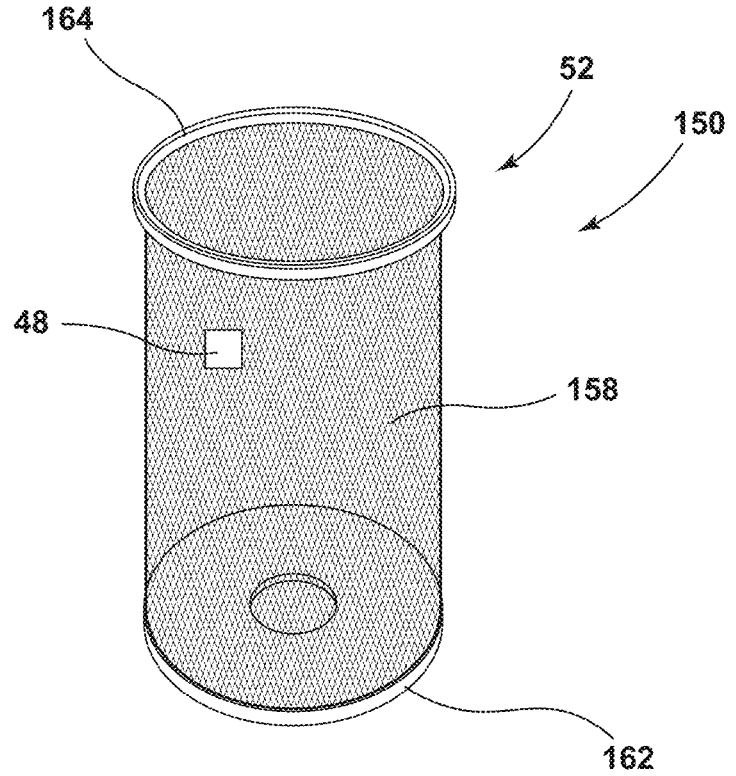
FIG. 15 is a side perspective view of an aspect of a canister of the laundry appliance of FIG. 12.

Referring further to FIG. 14, the canister 150 can have a rectangular shape and an indented feature 165 at least partially defined on the top portion 164 and the mesh walls 158. The indented feature 165 may be of various shapes and may at least partially comprise a mesh material of like quality or different quality to the mesh walls 158. For example, the indented feature 165 can be a rectangular shaped recess defined on the top portion 164, mesh walls 158, and have a mesh material of like quality to the mesh walls 158, as illustrated in FIG. 14. The indented feature 165 maximizes the collection of foreign substrates 48 by permitting airflow 56 and the foreign substrates 48 to enter into the canister 150 via the indented feature 165 and then allow for airflow 56 to exit through the mesh walls 158 apart from the foreign substrates 48.

Figures 16, 17:
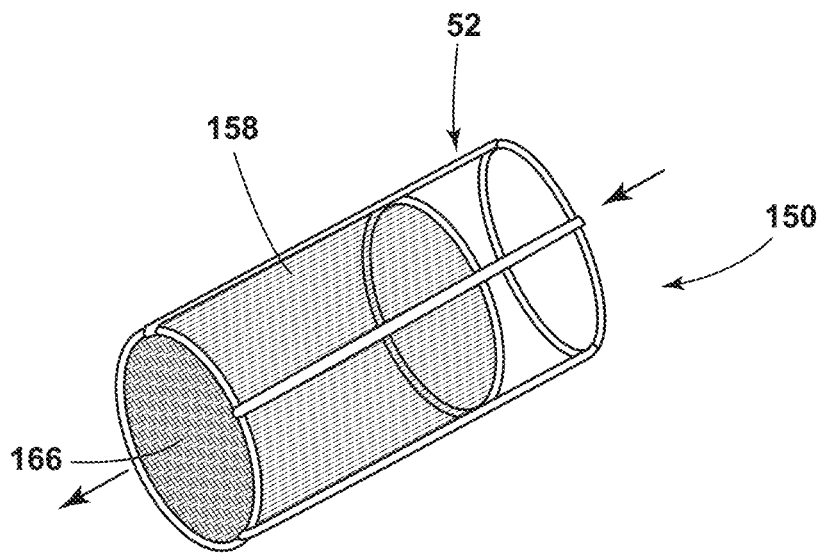
FIG. 16 is a top perspective view of an aspect of a canister of the laundry appliance of FIG. 12.
FIG. 17 is a top perspective view of an aspect of a canister of the laundry appliance of FIG. 12.
Figure 18:
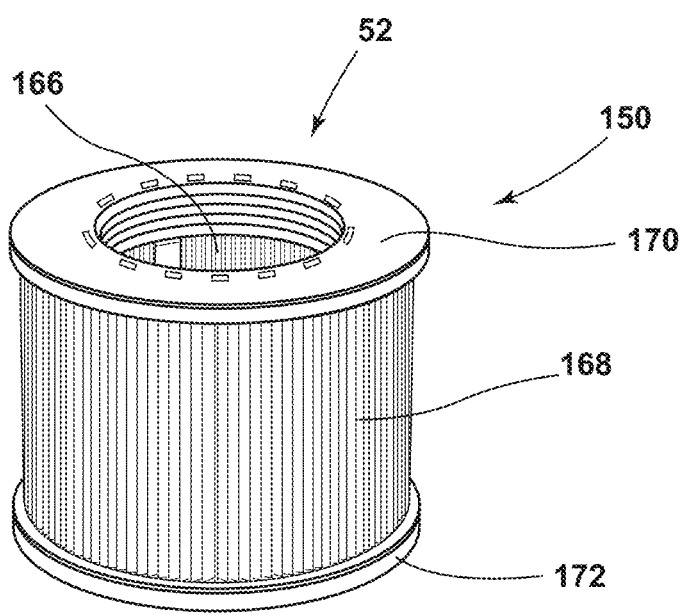
FIG. 18 is a top perspective view of an aspect of a canister of the laundry appliance of FIG. 12.

Referring now to FIGS. 16-18, the canister 150 can have a cylindrical and/or conical configuration, and the foreign substrates 48 may pass through a center 166 of the canister 150. The canisters 150 illustrated in FIGS. 17 and 18 include a paper filter wall 168 between a first end portion 170 and a second end portion 172. The paper filter wall 168 retains the foreign substrates 48 within the canister 150, while allowing the filtered air to pass through the canister 150. It is generally contemplated that the filtered air can be recycled back through the drum 14 (FIG. 1).

Figure 19:
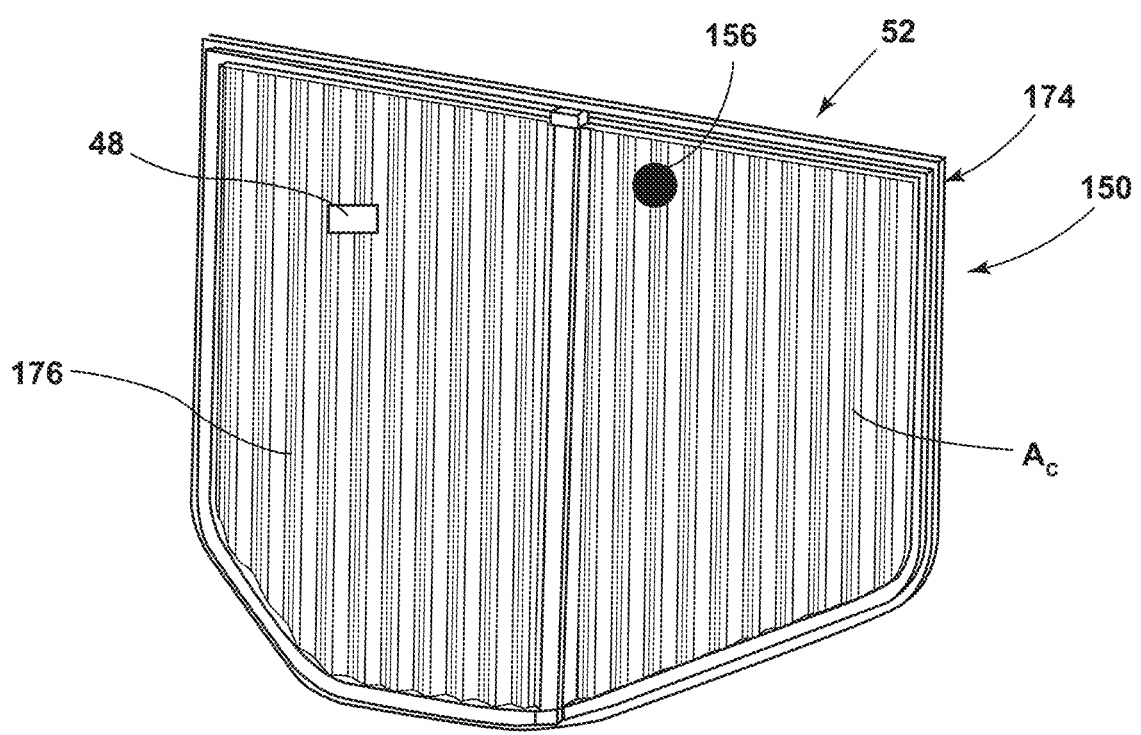
FIG. 19 is a side perspective view of a pet hair/lint trap of the present disclosure.

An alternate aspect of the canister 150 is illustrated in FIG. 19. In this aspect, the canister 150 is generally depicted as corrugated lint trap 174, such that a surface area $A_c$ of the canister 150 is corrugated to maximize the surface area $A_c$. A greater number of foreign substrates 48 can be collected on the corrugated lint trap 174 as a result of corrugations 176 along the surface area $A_c$. The canister 150, in any one of the above described configurations, maximizes the amount of foreign substrates 48 that can be collected prior to cleaning or other discharging of the foreign substrates 48 within the canister 150. Thus, the user can wait to empty the canister 150 after a predetermined number of laundry cycles, rather than emptying the canister 150 after every cycle. The canister 150 can include the sensor 156 that is communicatively coupled to the controller 24 (FIG. 1), which prompts the user when the canister 150 is full and needs to be cleaned.

Referring again to FIGS. 1-19, the laundry appliance 10 described herein is configured to maximize the removal of foreign substrates 48 from articles items 50. The foreign substrates 48 include, but are not limited to, pet hair that may be disposed on the articles 50 prior to and/or after a wash cycle. The laundry appliance 10 described herein is configured to remove the foreign substrates 48 via the various configurations of the foreign substrate collector 52. The foreign substrate collector 52 can be used in either a washer and/or dryer construction of the laundry appliance 10, depending on the needs of the user. Ultimately, the foreign substrate collector 52 allows the user to have articles 50 that are free from foreign substrates 48 by simply running a laundry cycle.

The invention disclosed herein is further summarized in the following paragraphs and is further characterized by combinations of any and all of the various aspects described therein.

According to one aspect of the present disclosure, a laundry appliance includes a cabinet. A drum disposed within the cabinet and has an inner circumferential wall. At least one lifter is operably coupled to the inner circumferential wall of the drum. A motor is operably coupled to the drum and is disposed within the cabinet. A controller is disposed within the cabinet and is communicatively coupled to the motor. A negatively-charged member selectively disposed within the drum. A negative charge is configured to attract oppositely-charged foreign substrates to the negatively-charged member. The negatively-charged member is selectively coupled to the at least one lifter.

According to another aspect, a negative charge of a negatively-charged member is defined by an ionizer.

According to another aspect, a laundry appliance includes a lint trap. A negatively-charged member is a coating that is disposed on the lint trap.

According to another aspect, a laundry appliance includes a lint trap. An electrostatic field is generated across the lint trap by an ionizer.

According to another aspect, a controller is configured with an algorithm configured to stop or alter rotational movement of the drum at a predetermined point in a laundry cycle. The algorithm is also configured to stop or alter a blower fan at the predetermined point in the laundry cycle.

According to another aspect, a controller algorithm is configured to add a post-cycle air dry phase that operates to dislodge foreign substrates from articles processed within the drum.

According to another aspect of the present disclosure, a laundry appliance includes a cabinet. A drum is disposed within the cabinet and has an inner circumferential wall. At least one lifter is operably coupled to the inner circumferential wall of the drum. A belt is disposed within the cabinet proximate the drum. A motor is operably coupled to the drum, is disposed within the cabinet, and is rearward of the belt. A controller is disposed within the cabinet and is communicatively coupled to the motor. A canister is disposed within the cabinet proximate the motor. The canister is configured to trap foreign substrates from the drum within the canister. According to another aspect, a canister is cylindrical and includes mesh to filter foreign substrates and contain the foreign substrates within the canister.

According to another aspect, a canister is cylindrical and includes mesh to filter the foreign substrates and contain the foreign substrates within the canister.

According to another aspect, a canister is rectangular and includes an indented feature at least partially defined on a top portion and a mesh wall adjacent the top portion, wherein the indented feature includes a mesh material.

According to another aspect, a canister is frustoconical and includes a mesh wall to filter the foreign substrates and contain the foreign substrates within the canister.

According to another aspect, a canister includes a top and a solid base, wherein a diameter of the top is greater than a diameter of the solid base.

According to another aspect, a mesh sidewall tapers downward towards the solid base.

According to another aspect, a canister sensor is coupled to a canister and is communicatively coupled to a controller. The canister sensor is configured to detect accumulated foreign substrates in the canister and send a signal to the controller and the controller is configured to determine an amount of accumulated foreign substrates in the canister from the signal.

According to another aspect of the present disclosure, a laundry appliance includes a cabinet. A drum is disposed within the cabinet and having an inner circumferential wall. At least one lifter is operably coupled to the inner circumferential wall of the drum. A motor is operably coupled to the drum and is disposed within the cabinet. A controller is disposed within the cabinet and is communicatively coupled to the motor. The controller is configured with an algorithm configured to stop or alter rotational movement of the drum at a predetermined point in a laundry cycle. The algorithm is configured to stop a blower fan or alter a blower fan at the predetermined point in the laundry cycle. A foreign substrate collector is operably coupled to the drum.

According to another aspect, a foreign substrate collector is coupled to at least one lifter and includes a housing, a frame coupled to the housing, and a filter operably coupled to the frame.

According to another aspect, a foreign substrate collector includes projections configured to collect foreign substrates from articles within a drum, wherein the projections are spirals configured to trap foreign substrates.

According to another aspect, a foreign substrate collector is a pet lint trap that is selectively disposed within a cabinet when a lint trap is removed from the cabinet.

According to another aspect, a pet lint trap has corrugations disposed along a surface area of the pet lint trap.

According to another aspect, a pet lint trap has a coating disposed along a surface area of the pet lint trap, wherein the coating is configured to attract and collect foreign substrates.

According to another aspect, an algorithm of a controller selectively adds a post-cycle air dry phase that is configured to dislodge foreign substrates from articles being processed in the drum after the laundry cycle is completed.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
   a cabinet;
   a drum disposed within the cabinet and having an inner circumferential wall;
   at least one lifter operably coupled to the inner circumferential wall of the drum;
   a motor operably coupled to the drum and disposed within the cabinet; and
   a controller disposed within the cabinet and communicatively coupled to the motor, wherein the lifter includes a negatively-charged outer surface that
   is configured to attract oppositely-charged foreign substrates to the negatively-charged outer surface, and wherein a negative charge of the negatively-charged outer surface is produced by an ionizer that is disposed within an interior of the lifter.

2. The laundry appliance of claim 1, further comprising a lint trap that includes a negatively-charged coating.

3. The laundry appliance of claim 1, further comprising a lint trap, wherein an electrostatic field is generated relative to the lint trap, and wherein a dedicated ionizer generates the electrostatic field.

4. The laundry appliance of claim 1, wherein the controller is configured to perform an algorithm, wherein the algorithm is configured to modify rotational movement of the drum at a predetermined point in a laundry cycle, and wherein the algorithm is further configured to modify operation of a blower fan at the predetermined point in the laundry cycle.

5. The laundry appliance of claim 4, wherein the algorithm is configured to add a post-cycle air dry phase that operates to dislodge foreign substrates from articles processed within the drum.

6. A laundry appliance, comprising:
   a cabinet;
   a drum disposed within the cabinet and having an inner circumferential wall;
   at least one lifter operably coupled to the inner circumferential wall of the drum;

a motor operably coupled to the drum and disposed within the cabinet;

a controller disposed within the cabinet and communicatively coupled to the motor, wherein the controller selectively operates an algorithm that is configured to temporarily stop and restart rotational movement of the drum during a drying cycle and maintain operation of a blower fan at a predetermined point in a laundry cycle, and wherein the algorithm is further configured to alter the operation of the blower fan at the predetermined point in the laundry cycle; and a foreign substrate collector operably coupled to the drum.

7. The laundry appliance of claim 6, wherein the foreign substrate collector is coupled to the at least one lifter, and wherein the foreign substrate collector includes a housing, a frame coupled to the housing, and a filter operably coupled to the frame.

8. The laundry appliance of claim 6, wherein the foreign substrate collector includes projections configured to collect foreign substrates from articles within the drum, and wherein the projections are spirals configured to trap foreign substrates.

9. The laundry appliance of claim 6, wherein the foreign substrate collector includes a lint trap and a pet lint trap, and wherein the lint trap and the pet lint trap are alternatively and selectively disposed within the cabinet and within an airflow path.

10. The laundry appliance of claim 9, wherein the pet lint trap has corrugations disposed along a surface area of the pet lint trap.

11. The laundry appliance of claim 10, wherein the pet lint trap has a coating disposed along the surface area, the coating being configured to attract and collect foreign substrates.

12. The laundry appliance of claim 6, wherein the algorithm selectively adds a post-cycle air dry phase that is configured to dislodge foreign substrates from articles being processed in the drum after the laundry cycle is completed.

13. The laundry appliance of claim 6, further comprising:

a particulate sensor coupled to the foreign substrate collector and communicatively coupled to the controller, wherein the particulate sensor detects an amount of accumulated foreign substrates within the foreign substrate collector and delivers a signal to the controller, and wherein the controller, in response to the signal from the particulate sensor, is configured to provide an indication, via a user interface, related to the amount of accumulated foreign substrates in the foreign substrate collector.

\*   \*   \*   \*   \*